(12) United States Patent
Schlecht et al.

(10) Patent No.: US 6,486,631 B2
(45) Date of Patent: Nov. 26, 2002

(54) DRIVE SYSTEM FOR RETRACTABLE COVERING DEVICES FOR MOTOR VEHICLES

(75) Inventors: Werner P. Schlecht, Vaihingen/Enz (DE); Holger Seel, Aidlingen (DE); Thomas Laudenbach, Rottenburg (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/982,735

(22) Filed: Oct. 18, 2001

(65) Prior Publication Data

US 2002/0074960 A1 Jun. 20, 2002

(30) Foreign Application Priority Data

Oct. 20, 2000 (DE) .......................... 100 52 042

(51) Int. Cl.⁷ .............................. H02P 1/00; H02P 3/00
(52) U.S. Cl. ...................... 318/445; 318/264; 318/434; 318/468; 318/626
(58) Field of Search .................................. 318/101–103, 318/264–266, 434, 445, 466–470, 626

(56) References Cited

U.S. PATENT DOCUMENTS

| | | | | | |
|---|---|---|---|---|---|
| 5,654,615 A | * | 8/1997 | Brodsky | ................. | 296/107.08 |
| 5,825,147 A | * | 10/1998 | Porter et al. | ................. | 296/117 |
| 5,844,382 A | * | 12/1998 | Dan | ............................. | 318/10 |
| 5,864,214 A | * | 1/1999 | Brodsky | ................. | 296/107.08 |
| 5,903,114 A | * | 5/1999 | Miller et al. | ............. | 15/250.22 |

* cited by examiner

*Primary Examiner*—Marlon T. Fletcher
(74) *Attorney, Agent, or Firm*—Leydig, Voit & Mayer, Ltd.

(57) ABSTRACT

A drive system for a covering device, which can be rolled up or folded, for motor vehicles is equipped with a control device. The control device has a current sensor for detecting the current applied to an electric motor of the drive system in the course of moving the covering device. The control system measures a current parameter at the start of the movement of the covering device and switches off the current to the motor as soon as switch-off criteria derived from the current values measured at the start of the movement have been reached.

26 Claims, 8 Drawing Sheets

DRIVE SYSTEM FOR RETRACTABLE COVERING DEVICES FOR MOTOR VEHICLES

FIELD OF THE INVENTION

The present invention relates generally to a retractable covering or separating device for motor vehicles, and more particularly to a retractable covering or separating device that is operated by an electric motor.

BACKGROUND OF THE INVENTION

There are a number of retractable covering (or separating) devices used in motor vehicles, which can be rolled up or folded and are driven by an electric motor. Examples of such covering device are windup rollers for rear windows, such as described in DE 44 12 557. Many of these covering devices have a windup shaft on which a web, such as a windup roller web or a separating screen, is fastened along an edge and can be rolled up onto the shaft. The windup shaft is pre-stressed in the winding direction of the respective web by means of a spring drive, and the web is pulled off or unwound from the windup shaft with the aid of an electric motor against the action of the spring.

Two pivot levers are provided in the above mentioned rear window windup roller, which are seated next to the windup shaft and are rotatable around an axis extending perpendicularly with respect to the axis of the windup shaft. The pivot levers are moved with the aid of two coupling rods. One end of each coupling rod is fastened by means of a hinge to one of the pivot levers, and the other end of each coupling rod is connected to a respective crank pin, which are in turn fixed on the output shaft of the gear motor. It is also known to use a kinematic reversal, wherein the pivot lever is pre-stressed by means of springs in the unwinding direction, while the windup roller itself is driven by the electric motor. Another variation consists of foldable covering devices, wherein a hoop is driven. Typically, the hoop travels the greatest distance during retraction and extension.

A time function element is typically used for controlling such rear window windup roller and covering devices, which puts the motor into motion for a defined length of time when activated. By means of the time function element, it is intended to relieve the burden on the driver of the vehicle. By a brief actuation of the appropriate directional switch, the windup roller is either completely retracted or completely extended. The driver is not required to either operate the activating button for an appropriate length of time or to remember to bring the switch back into its off position.

In order for this type of control to operate properly, it is necessary that the mechanical drive be sufficiently robust to withstand, without being destroyed, the maximum torque the motor can exert in case of blockage. For this reason, the mechanical parts of the drive systems are typically greatly over-dimensioned, particularly with respect to movement in connection with which pressure forces occur, which could lead to warping of the respective rods. Crank pins are another weak point, which cannot be permitted to break off in case of blockage.

OBJECTS AND SUMMARY OF THE INVENTION

In view of the foregoing, it is an object of the invention to create an improved drive system for a motorized retractable covering device that is able to shut the electric motor off before excessive forces can occur. As used herein, the term "covering device" is intended to include separating devices.

In accordance with this and other objects of the invention, the present invention provides a drive system for a retractable covering device used in a motor vehicle that is operated by an electrical motor to move between two end positions. The drive system includes a current sensor for detecting the current applied to the electric motor and uses the detected current information to decide when to shut off the electric motor. To that end, the drive system includes a control device that monitors the current and measures at least one electrical current parameter when the electric motor is supplied with current to move the covering device to leave one end position toward another end position. The value of the electrical current parameter measured in this way is stored as a reference value, and subsequently measured values of the electrical current parameter are compared with the reference value in order to switch off the current for the electric motor when the comparison between the reference value and a subsequently measured value of electrical current parameter meets a pre-defined condition.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

The present invention is directed to a way to control the operation of an electric motor in a drive system of a retractable covering or separating device for motorized vehicles. The control in accordance with the invention is based on the observation that at least one maximum occurs in the chronological course of the electrical current applied to the electric motor, which is caused by the so-called breakaway torque. For this reason it is difficult to achieve adequate operation control by using a fixed, pre-selected, threshold value which when exceeded would lead to the motor being switched off. This is because the maximum caused by the breakaway torque may exceed such pre-selected threshold and cause the motor to be switched off before the desired end state is reached.

In accordance with the invention, the drive system dynamically sets a threshold value based on measurements of the current applied to the electric motor during the initial period of operation during which the maximum occurs. To that end, the covering device contains a control device that is designed such that it measures at least one electrical current parameter when the electric motor is supplied with current to move the covering device out of an end position. The value of the electrical current parameter measured in this way is stored as a reference value. After the reference value is set, subsequently measured values of the electrical current parameter are compared with the reference value in order to switch off the current for the electric motor as a function of the comparison, i.e., whether a mathematical relationship between the actual value of the electrical current parameter and the reference value is met.

This way of controlling the motor operation makes it possible for the drive system to learn if the drive system has a greater or lesser stiffness based on the temperature. Moreover, it is possible in this way to appropriately take torque changes, which occur in the course of actuation, into consideration in order to avoid control errors. In particular, depending on lever ratios and possible relief measures by means of auxiliary springs, additional current peaks can occur between the peak caused by the breakaway torque and the current increase that occurs when the covering device reaches the destination end position.

The term "electrical current parameters" is to be understood as physical values related to the electrical current flowing through the motor that are to be measured during the course of operation and are suitable as switch-off criteria. Suitable electrical current parameters include, for example, the magnitude of the current, the chronological course of the current, or the speed or rate of the current increase. In this way, it is possible after the start of the drive system, i.e., the switching on of the current for the electric motor, to measure the first peak current value, for example. If required, this value is provided with a correction value to generate the reference value. As soon as the reference value is reached the next time during the course of operation, the control switches the current for the electric motor off.

This system presumes that in the course prior to reaching the desired end position, the current does not for a second time attain a value which lies above the first peak value following the switch-on of the motor current. It is possible to employ differing reference values depending on the direction in which the drive system is respectively put into operation. In other words, a reference value may be assigned to each movement direction. This reference value can be stored for more than one use and can be combined with previously used reference values to form an averaged reference value, wherein this averaged value then constitutes the actual reference value which is used for the comparison.

Another possibility for the switch-off criteria is the speed or rate of current increase as already mentioned above. This approach uses the fact that in a predetermined interval of time (which is mostly a function of the construction and is independent substantially from differences in manufacturing) immediately following the switch-on of the motor current and the breakaway of the drive mechanism, an averaged current section occurs which is gentler than the current increase that is observed when the covering device (e.g., a window shade web) has been completely extended and the drive mechanism has reached the end stop. The peak rate of current increase, which is measured during breakaway in the time window as the current-time difference quotient, is used as the reference value and is checked to see whether a current increase occurs in a narrow time window such that the increase rate is steeper than the reference value. If this is the case, the control device shuts the current for the electric motor off.

In this regard, electric motors briefly generate periodic current spikes that are caused by the commutator. The time spacing of the current spikes is inversely proportional to the number of revolutions. The current spikes can possibly cause detection errors, since the control device samples the current. Such detection errors can be prevented if filtering of the measured signal is performed. This filtering can be performed in the microprocessor of the control device itself, or by means of a low-pass filter that suppresses the current spikes. The low-pass filter is inserted between the current sensor and the respective input of the control device. The threshold frequency of the low-pass filter should be selected to be such that no unnecessary delay, which could result in control errors, is created.

A low-pass filter is not only advantageous when the current value is to be measured, but also for measuring the speed of the current rise. The superimposed spikes can possibly simulate an increased steepness of the current rise. Conversely, with an opposite phase position they can also simulate a decrease in the speed of the current rise. These unwanted effects of the current spikes can be seen by considering the scenario where the first measured value is taken at a time the current spikes occurs, while the second measured value falls into a trough between two spikes.

The time window for detecting the speed or rate of increase of the current preferably starts directly following the switch-on of the motor current, or the arrival of a command for switching the motor current on. The control device in accordance with the invention can be manually triggered, but can also be used in connection with automatic systems that trigger the retraction or extension of the covering device as a function of other environmental circumstances or parameters.

As already mentioned above, the measured reference value can be provided with a correction value. This correction value can be a fixed correction value, which results on the basis of the experience with the particular construction of the respective covering device, or it can be a correction value that was obtained in the course of the operation of the covering device. Examples of factors affecting such correction values include the temperature, which is measured with the aid of an appropriate sensor, and the stiffness or ease of running of the mechanical system, which may be determined by measuring the electrical work in a defined time window. With chronologically fixed time windows, the work to be performed is obviously a function of whether the system operates stiffly and requires a large torque, or is relatively easy running. The stiffness may also change due to an increase in temperature and therefore only needs to put out reduced electrical work in this time window.

A time slot, within which the switch-off of the motor current has to take place, can be provided in the control device as a precautionary measure. In this case the starting edge of the time slot that is adjacent to the switch-on fixes the earliest time at which the switch-off is to take place, while the other edge of the time slot defines the latest time at which the switch-off is to take place.

Figure 1:
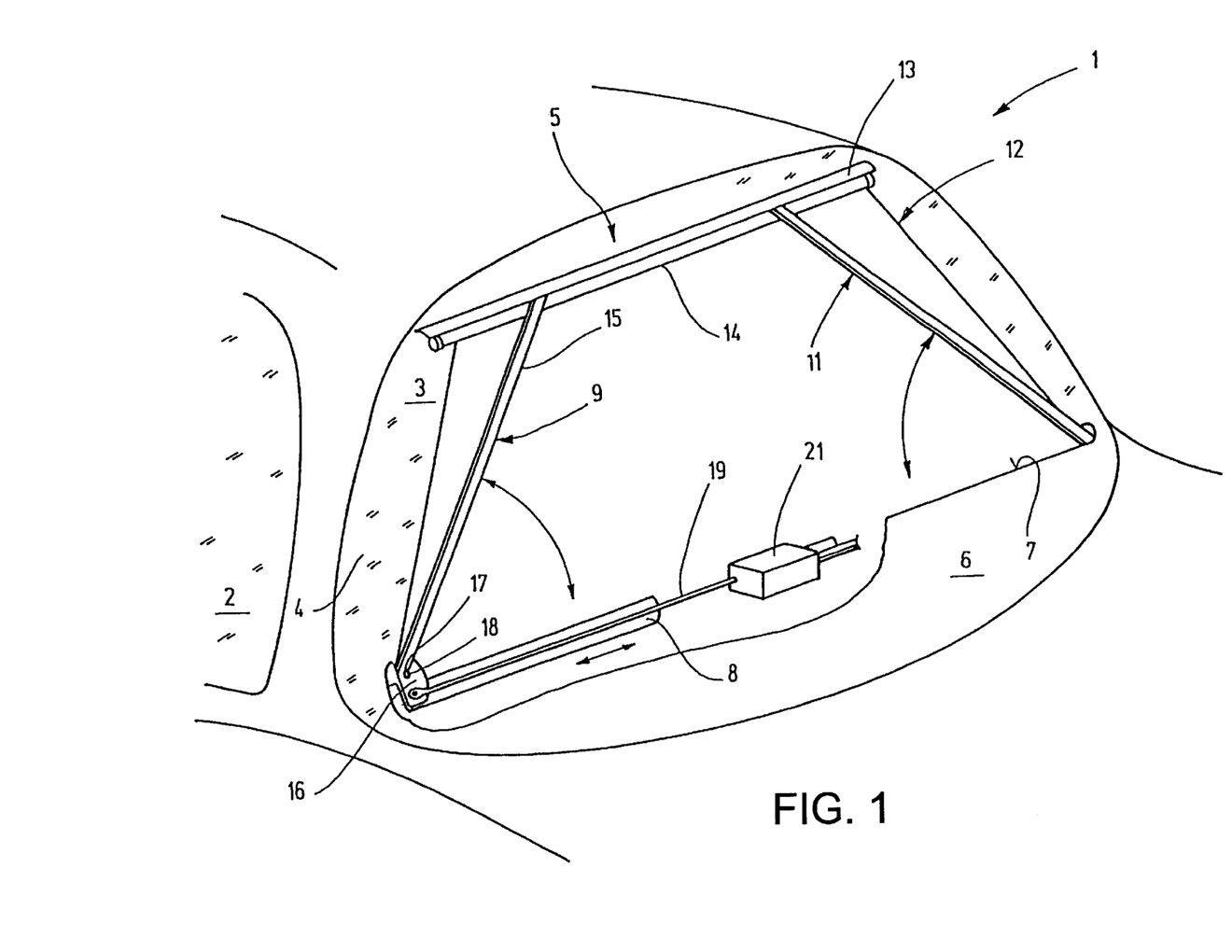
FIG. 1 is a partially fragmented perspective view of a windup roller mounted in the rear window a motor vehicle as an example of a retractable covering system embodying the invention.

With the invention described generally above, the description of specific embodiments is now provided. Referring now more particularly to the drawings, in a greatly schematized manner, FIG. 1 represents the rear end of a motor vehicle 1 in a view from behind. A left rear side window 2, as well as a rear window 3 with the usually curved window pane 4 can be seen in the perspective view.

A windup roller 5 is located in front of the inside of the window pane 4 and is shown in the extended state. A rear window shelf 6 can also be seen in a broken-away representation in FIG. 1, in which an outlet slot 7 extending over the width of the rear window shelf 6 is contained. The windup roller 5 is an example of a covering device of a motor vehicle, which can be moved back and forth between a first end position and a second end position. Further examples of covering devices are separating screens or cargo area covers, which can also be equipped with the drive system of the invention.

A windup shaft 8, two spreading levers 9 and 11, a windup roller web 12, as well as a pull rod 13 are part of the windup roller 5. The windup shaft 3, a section of which can be seen in the broken away portion of the rear window shelf 6, is rotatably seated below the rear window shelf 6 by means of seating arrangements, not further represented. A spring motor, which continuously pre-stresses the windup shaft 8 in the winding direction of the windup roller web 12, is located in the interior of the windup shaft 8. The windup shaft 8 lies horizontally approximately underneath the straight outlet slot 7 and extends parallel to it. The windup roller web 12 consists of a smooth perforated plastic foil, which is fastened with one edge on the windup shaft 8, and with its other edge, which is parallel with it, on the pull rod 13.

The two spreading levers 9 and 11 are laterally reversed with respect to each other, so that the description of the spreading lever 9 applies analogously to the spreading lever 11. The spreading lever 9 is a two-armed lever with a lever section 15, as well as a lever section 16.

A seating bore 17 is located at the transition point between the two lever sections 15 and 16, with the aid of which the spreading lever 9 is pivotably seated on a bearing neck 18. The bearing neck 18 is fastened on the underside of the broken away portion of the rear window shelf 6 next to the outlet slot 7. The orientation of the bearing neck 18 has been provided in such a way that the lever section 15 moves in a plane, which extends approximately parallel with the plane defined by the window pane 4. The spreading lever 9 can be transferred from a position in which the lever section 15 extends approximately parallel with the windup shaft 8 into a position in which it is aligned approximately parallel with the lateral border edges of the rear window 3.

To move the spreading lever 9 back and forth between these two end positions, the lower lever section 16 is connected via an actuating rod 19 with a drive motor 21. The actuating rod 19 extends approximately parallel with the windup shaft 8 and is also located underneath the rear window shelf 6, together with the drive mechanism 21. The spreading lever 11 is designed laterally reversed and is moved in the opposite direction by means of a corresponding actuating rod 22.

The drive system has a permanently exited direct current ("d.c.") motor 23, as well as a toothed gearing 24, on whose input shaft 25 a disk 26 is seated, which is fixed against relative rotation and supports two crank pins 27 and 28. The two actuating rods 19 and 20 are hinged to these crank pins 27 and 28.

Figure 2:
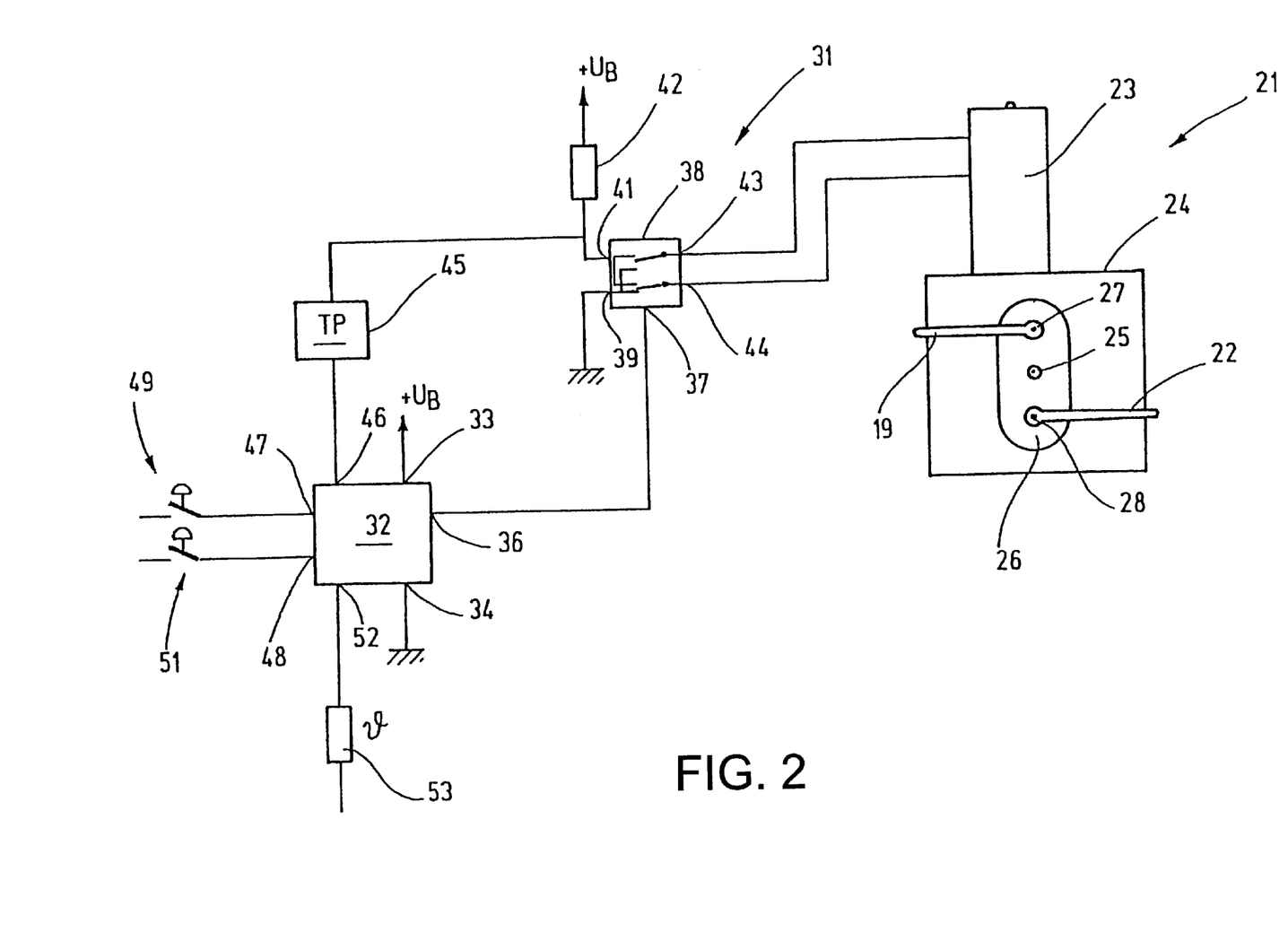
FIG. 2 is a schematic diagram showing a control circuit for the drive system of the rear window windup roller illustrated in FIG. 1.

A control device 31 is a further part of the drive system 21. It has a microprocessor 32, which contains an internal program and data storage, as an essential component. A current supply input 33 of the microprocessor 32 is connected with the electrical system of the vehicle, while a second input 34 is connected to a vehicle ground 35.

A controlled output 36 is connected with a control input 37 of a pole changing switch 38. The pole changing switch 38 has two inputs 39 and 41, one of which is connected with the vehicle ground, while the other input 41 is connected via a resistor 42 with the positive supply voltage, to which the current supply input 33 of the microprocessor 32 is also connected. The resistor 42 is used as a current sensor.

The pole changing switch 38 is provided with two outputs 43 and 44, which are connected via appropriate conductors with the current supply inputs of the permanently exited motor 23. The pole changing switch 38 has a center position, in which the current supply to the motor 23 is interrupted. In each one of the two other end positions, the motor 23 is connected with the respective polarity with the electrical system of the vehicle, namely at one end via the current sensor resistor 42. The current consumed by the motor 23 as measured by the current sensor is generally proportional to the torque delivered by the motor, and therefore proportional to the force appearing in the linkage, taking into consideration the respective lever relations. Since the electrical system of a motor vehicle is generally heavily subjected to interference signals, it is useful to move at least the current sensor resistor 42 spatially as closely as possible to the electric motor 23.

As shown in FIG. 1, an input of a low-pass filter 45 is connected with the input 41 of the pole changing switch 38, whose output side is connected with a measuring input 46, embodied as an analog/digital converter, of the microprocessor 32. This low-pass filter, as mentioned above, is for filtering out the spikes in the electrical current caused by the commutator. Two further inputs 47 and 48 are connected with manual keys 49 and 51. Finally, an input 52 can also be connected with a temperature sensor 53.

This arrangement operates in the following manner. By actuating the key 49 by the driver, for example, the microprocessor 32 receives an appropriate signal at its input 47, which is interpreted as putting the motor 23 in the extension direction of the rear window windup roller 5. At its control output 36, the microprocessor 32 issues an appropriate control signal to the pole changing switch 38, which thereupon switches over in one of the two end positions, namely into the one in which the d.c. motor 23 receives current of the required polarity from the vehicle electrical system. The current flows through the sensor resistor 42 and generates a voltage drop proportional to the current.

The voltage drop on the "output side" of the current sensor resistor 42 is filtered through the low-pass filter 45 and supplied to the signal input 46. Digitization of the analog value is performed by the analog-to-digital converter in the microprocessor. Furthermore, the supply voltage is internally measured in the microprocessor 32 at the current supply input 33. The supply voltage is also digitized and is compared with the voltage at the output of the low-pass filter 45. The voltage difference determined in this way is a measurement of the voltage drop across the current sensor resistor 42 and therefore a measure of the current flowing through the resistor and the electric motor. To that end, the value of the current sensor resistor 42 is known and is accordingly taken into consideration in the program of the microprocessor 32.

As soon as the rear window windup roller 5 has been completely extended, the current through the current sensor resistor 42 rises sharply, which is detected by the microprocessor 32 via the input 46. In response, the microprocessor 32 switches off the control signal at the output 36. Thereupon the pole changing switch 38 returns into the neutral position. The electrical current connection between the motor 23 and the vehicle electrical system is interrupted when the switch is in the neutral position.

The microprocessor 32 assures that the rear windup roller is completely extended, regardless of the length of the actuation of the key 49. It also assures the switch-off of the current supply for the motor 23, if the driver should actuate the key 49 longer than absolutely necessary.

The drive system moves in the reverse direction when the user depresses the key 51 for retracting the rear window windup roller 5. Practically the same program runs in the microprocessor 32 for retraction, but with the only difference that the control signal at the output 36 moves the pole changing switch 38 into the other switching position, in which the motor 23 is connected with the vehicle electrical system with a polarity that is reversed in respect to the extension.

Figure 3:
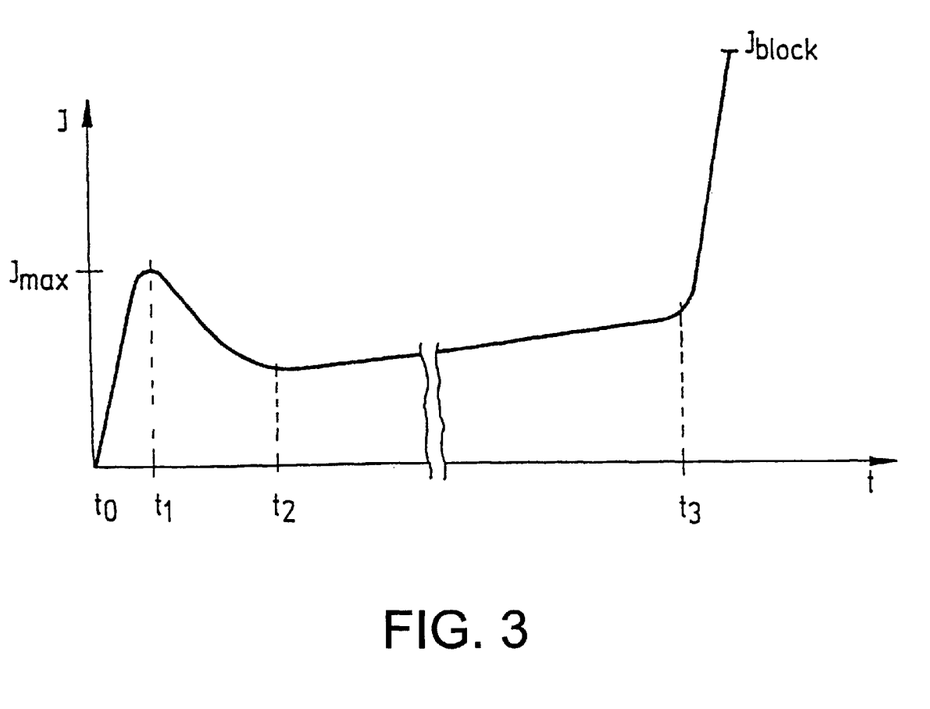
FIG. 3 is a graph showing an exemplary plot of current applied by a drive system as a function of time to an electrical motor for operating the rear window windup roller in FIG. 1.

The current through the electric motor as a function of time can be seen in FIG. 3 as it occurs when the rear window windup roller 5 is brought out of one end position into the other end position. The graph shows the current through the sensor resistor 42. The current for the motor 23 is first switched on at a time $t_o$. The first current maximum $I_{max}$ occurs at a time $t_1$. This current maximum is caused by the breakaway torque, which occurs for putting the mechanical system of the rear window windup roller 5 into action to leave a steady state at an end position of the covering device.

As soon as the mechanical system moves at the time $t_1$, the current leaves its maximum value $I_{max}$ and drops to a lower value, for example until the time $t_2$. Depending on the lever arrangement and other resistance moments, the motor current possibly slowly and steadily increases, starting at the time $t_2$ until, approximately at the time $5_3$, when a mechanical end position is achieved and the further turning of the motor is blocked. The motor current will therefore climb comparatively very steeply to a maximum blocking value $I_{block}$, starting at the time $t_3$.

The blocking current $I_{block}$ is the current that is created when the armature of the motor 23 is stopped. In this state the motor 23 simultaneously generates its greatest torque, which possibly is too great for the mechanical parts to withstand without damage in the long run, or during repeated loads. Therefore the control device 31 sees to it that the current for the motor 32 is switched off when the end position has been reached and before the blocking current $I_{block}$ has been reached, for example, switch-off takes place when the current rises to a value which lies slightly above the peak current $I_{max}$ as the breakout current.

Figure 4:
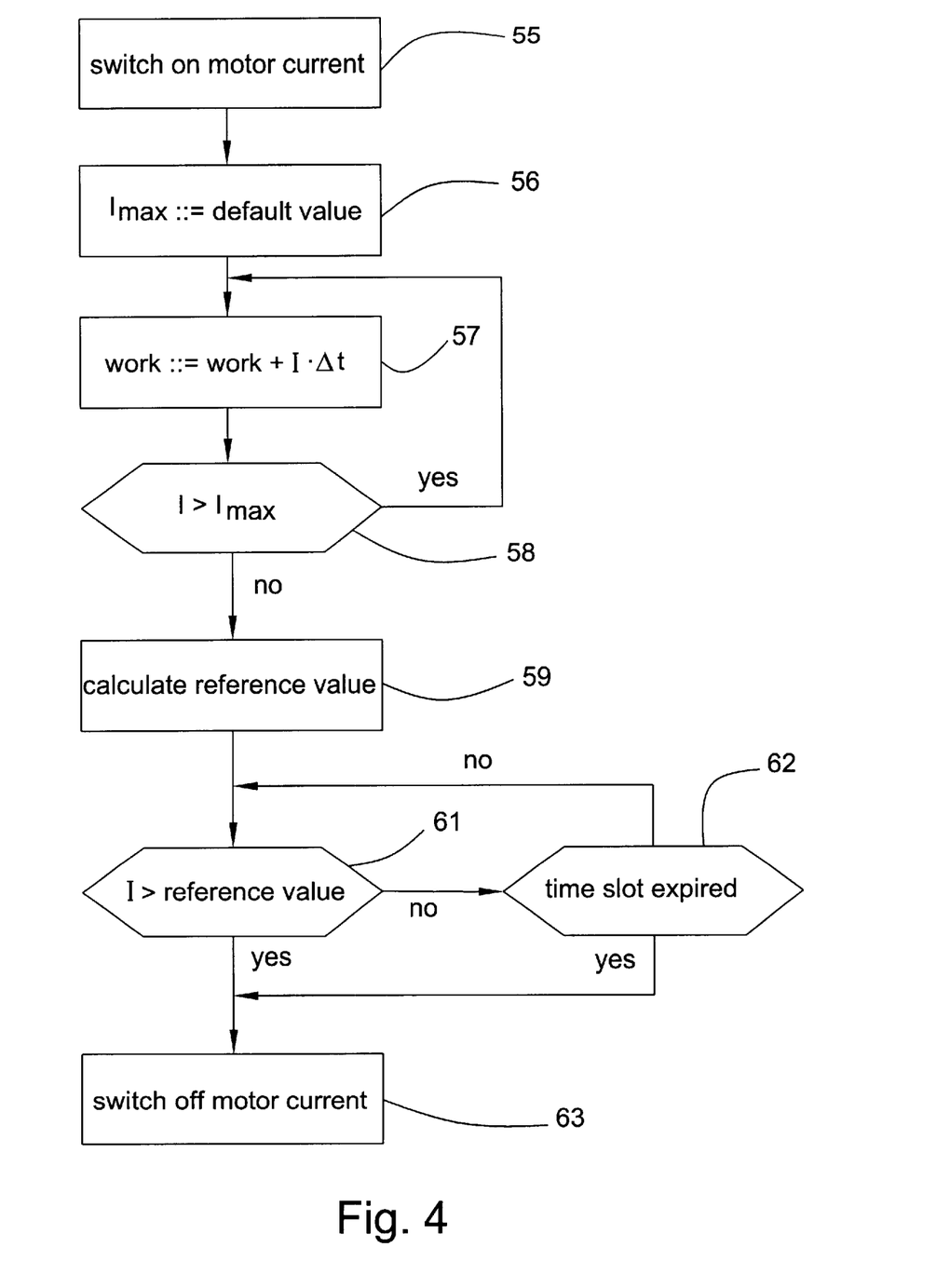
FIG. 4 is a flow chart for a process performed by the drive system of FIG. 2 to control the operation of the electrical motor based on the current value.

FIG. 4 shows the flow diagram of the program for the microprocessor 32. Upon actuation of one of the two keys 49 or 51, the current for the electric motor 23 is switched on in an instruction block 55 in that an appropriate signal for the output 36 is delivered to the pole changing switch 38. Thereupon the program variable $I_{max}$ is set to a base value in an instruction block 56.

A subsequent instruction block 57 is used for measuring the integral over the current of the program section. The integral is increased during each passage respectively by the measured current value multiplied by $\Delta t$. Here, $\Delta t$ corresponds to the time needed by the loop passage until the instruction block 57 is again addressed.

After leaving the instruction block 57, a check of the actually measured current takes place in an interrogation block 58 to determine whether the measured current is greater than the previously measured current. It is assumed in this program section that the default value is zero, so that the condition that the program is branched after the interrogation block 58 to the input of the instruction block 57 is already met during the first passage through the loop.

A circulation through this small program loop takes place until the current begins to drop after the breakout of the mechanical parts, so that the condition, wherein the actually measured current is greater than the previously stored value $I_{max}$, is no longer met. When this condition is no longer met, the motor current starts to drop, and the program branches off after the interrogation block 58 to an instruction block 59, in which the reference value is calculated. In this embodiment, the calculation of the reference value is based on the value of the program variable $I_{max}$, taking into consideration factors such as the work performed in the form of the integral over the current course until this peak value is reached, or for example the temperature, or previously performed calculations of the reference value from previous program runs.

After the reference value has been calculated in the instruction block 59, a check is made in an interrogation block 61 whether or not the actual current, which is respectively measured, exceeds the reference value. As long as the current is less than the reference value, the program arrives at an interrogation block 62, in which a time slot is checked.

By means of the time slot it is assured that the motor current is switched off in the instruction block 55 in every case after a defined period of time since the motor current was switched on. In case of an error-free run this condition is not met, so that the program returns to the input of the interrogation block 61 after the check in the interrogation block 62. A run through this short program loop consisting of the two interrogation blocks 61 and 62 is performed until either the time slot has expired, or the actual motor current becomes greater than the reference value because the drive system has run up against a mechanical blockage. Thereafter the program continues to an instruction block 63 in that the microprocessor 32 sees to it that the pole changing switch 38 returns into its neutral position. The above explained flow diagram has been greatly simplified in the details. For instance, the respectively desired direction, registration standardization, useful wait loops and/or the transfer to other sub-programs have not been taken into consideration in order to make the description of the process easier to follow. Those skilled in the art should have find no problem adding such details.

The detection of the current integral up to the time the current maximum is reached at startup can be understood to be a measure of the stiffness or easy running of the system. By means of this it is possible for stiff systems to move the switch-off threshold farther upward in order to assure the sufficient pre-tension in the mechanical system in the end position. The pre-tension is important for avoiding clattering noises or vibrations that can occur when shaking overcomes the available pre-tensing force.

Figure 5:
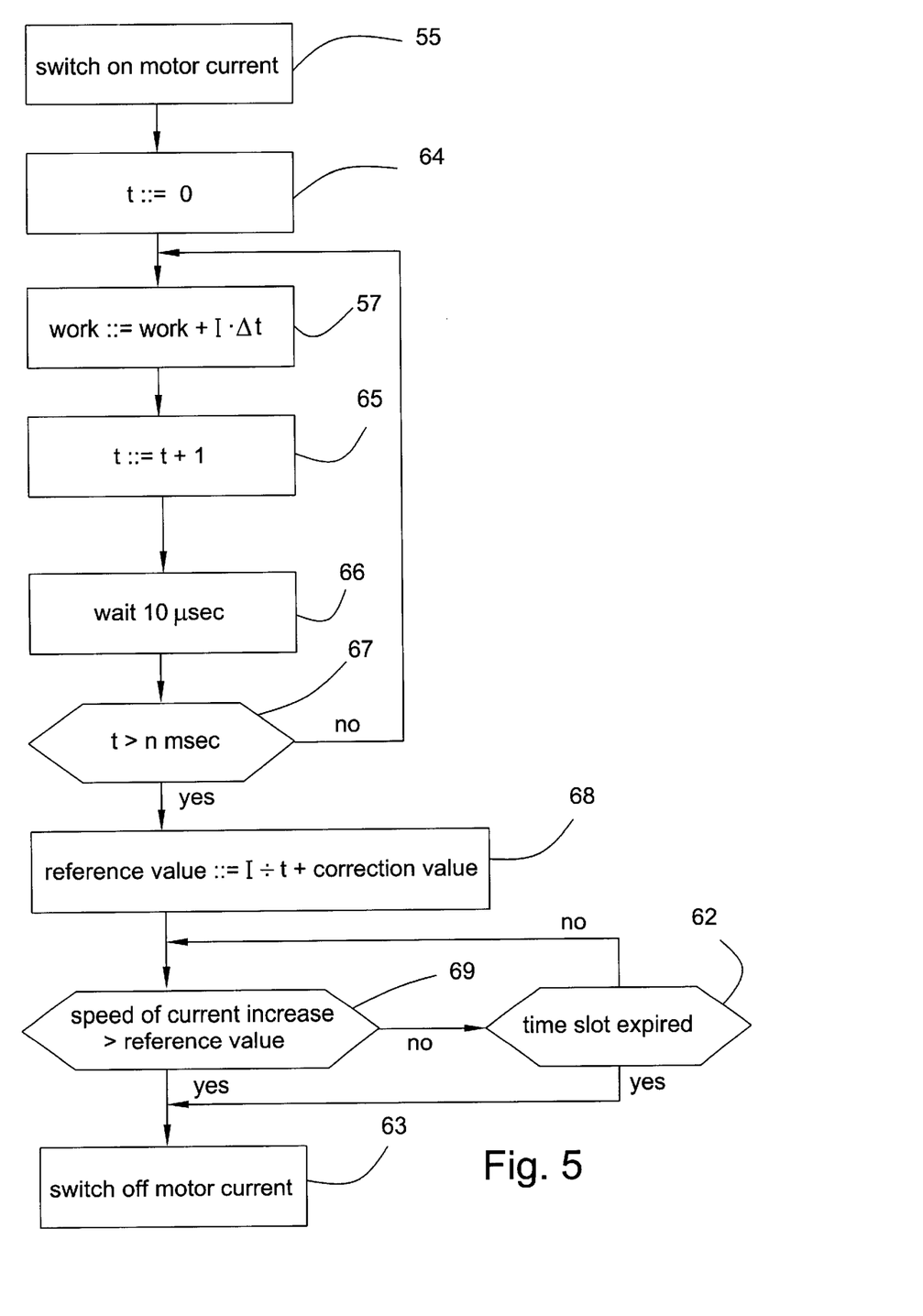
FIG. 5 is a flow chart for a process performed by the drive system of FIG. 2 to control the operation of the electrical motor based on the speed or rate of the current rise.

FIG. 5 shows a flow diagram that is similar to the flow diagram in accordance with FIG. 4, but with the difference that the speed of the current rise is evaluated in place of the peak current value. Following the actuation of one of the two keys 49 or 51, the motor current is again switched on with the respectively required polarity corresponding to the desired direction of rotation in the instruction block 55. A program variable t used for measuring time is set back to zero in an instruction block 64. As in the previous case, the current integral is again formed in the instruction block 57, and subsequently the stored variable is increased by one in an instruction block 65.

Following the increase in the program variable t, the program waits for a predetermined period of time in an instruction block 66 and then continues to an interrogation block 67 in which a check is performed whether the value of the program variable t has assumed a value which corresponds to a length of time of more than n milliseconds.

If the condition has not been met, the program returns to the input of the instruction block 57 until the condition has been met. When the condition has been met in the interrogation block 67, the program continues with an instruction block 68. In this instruction block 68 the steepness of the current increase is measured as a quotient of the instantaneous current, divided by the length of the time interval that has passed since the instruction block 55 was left. A speed of the current rise is determined in this way and is averaged over the affected time interval. The speed of the current rise can also be provided with a correction value, i.e. it can be distributed or flattened, depending on whether the system is stiff or easy running, or the resilience of the system in the area of the mechanical detent is also taken into consideration. The resilience is a structural value, which can be considered as a fixed value in the program. The speed of the current rise obtained in this manner is stored as a reference value. After fixing the reference value in the instruction block 68, a continuous check is performed in an interrogation block to determine whether the speed of the current increase measured from this time on exceeds the reference value. It is understood that this speed of the current increase is measured via a time window that is slidingly carried along in the program.

The time window is of a length that is short in comparison with the increase time of the blocking current as soon as the mechanical device of the windup roller 5 is moved against a detent. The respective steepness of the current increase is determined inside this time window and is compared with the reference value. How to program such a time window is known to one skilled in the art and therefore it is not necessary to explain it here in detail. Depending on how the check in the interrogation block 69 comes out, the continuation proceeds either via the already described interrogation block 62 or to the instruction block 63.

For the sake of clarity, the control device has been described as if two alternatives, namely the alternative in accordance with FIG. 4 or the alternative in accordance with FIG. 5 had been implemented. It is understood that both algorithms can be applied together in one program, i.e. switch-off takes place as a function of the actual value of the current or of the speed of the current rise, depending on which event has priority or first leads to meeting the breakoff criteria.

In place of measuring in the instruction block 57 the work performed within a defined time interval, which can also be fixed, in order to determine the stiffness, it is also for example possible to include the temperature measured by the temperature sensor 53. It is also possible to determine the correction value empirically and to implement it once in the program, so that the instruction block 57 is omitted. In a borderline case the correction value may be 0.

Further possible changes of the described program run include recording the number of uses of the rear window windup roller 5, for example, in the program. A part of this can also be to put down the respectively used reference value for each run and to create an averaged reference value from the number of the reference values.

The time slot in the interrogation block 62 can also be changed in such a way that a premature switch-off is prevented, if premature switch-off criteria are met for any reasons. It is moreover possible to prescribe limits for the reference value, which are not downwardly or upwardly exceeded. In case of doubt the reference value is fixed to the lower or the upper limit, depending on whether a value, which lies above the upper limit, or below the lower limit, is generated during the first measurement of the reference value.

Figure 6:
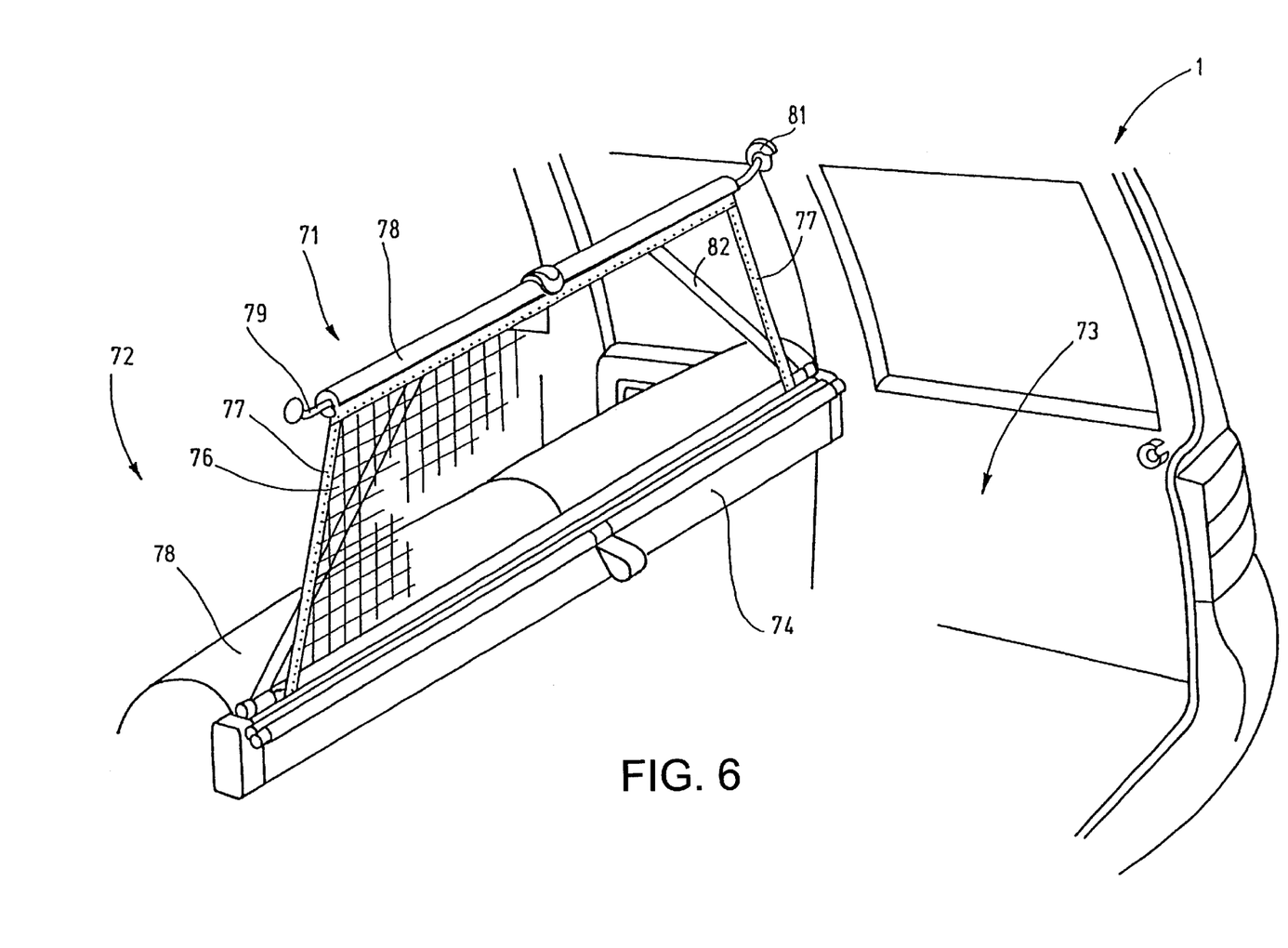
FIG. 6 is a perspective view of a separating screen as another example of a covering system embodying the invention.

FIG. 6 shows another exemplary embodiment of the application of the drive system in accordance with the invention, namely in the form of a separating screen 71, which is to be stretched between a passenger compartment 72 and a cargo area 73 of the passenger car 1.

The separating screen 71 has an elongated housing 74, which has been fastened to the back of a set back 75 of a rear bench seat and extends over the entire width of the vehicle. A windup shaft is rotatably seated in the interior of the housing 74 in a manner similar to that of the windup shaft 8 of the rear window windup roller 5. A woven lattice net 76 is fastened on this windup shaft. The lattice net 76 consists of plastic threads and has an approximately trapezoidal shape. The lateral edges are secured by binder tapes 77. A pull rod 78 is fastened on an edge of the lattice net 76 remote from the windup shaft, or from the housing 74, and is provided with suspension means 79 at the ends. The suspension means are intended for being suspended in receiving pockets 81 fixed on the vehicle.

Two pivotable levers 82 are provided to spread out the lattice net 76 and are to be actuated in a way similar to the pivot levers 9 and 11 of the rear window windup roller 5. Therefore a detailed description of the spreading mechanism can be omitted. The actuation of the associated gear motor takes place as previously described.

Figure 7:
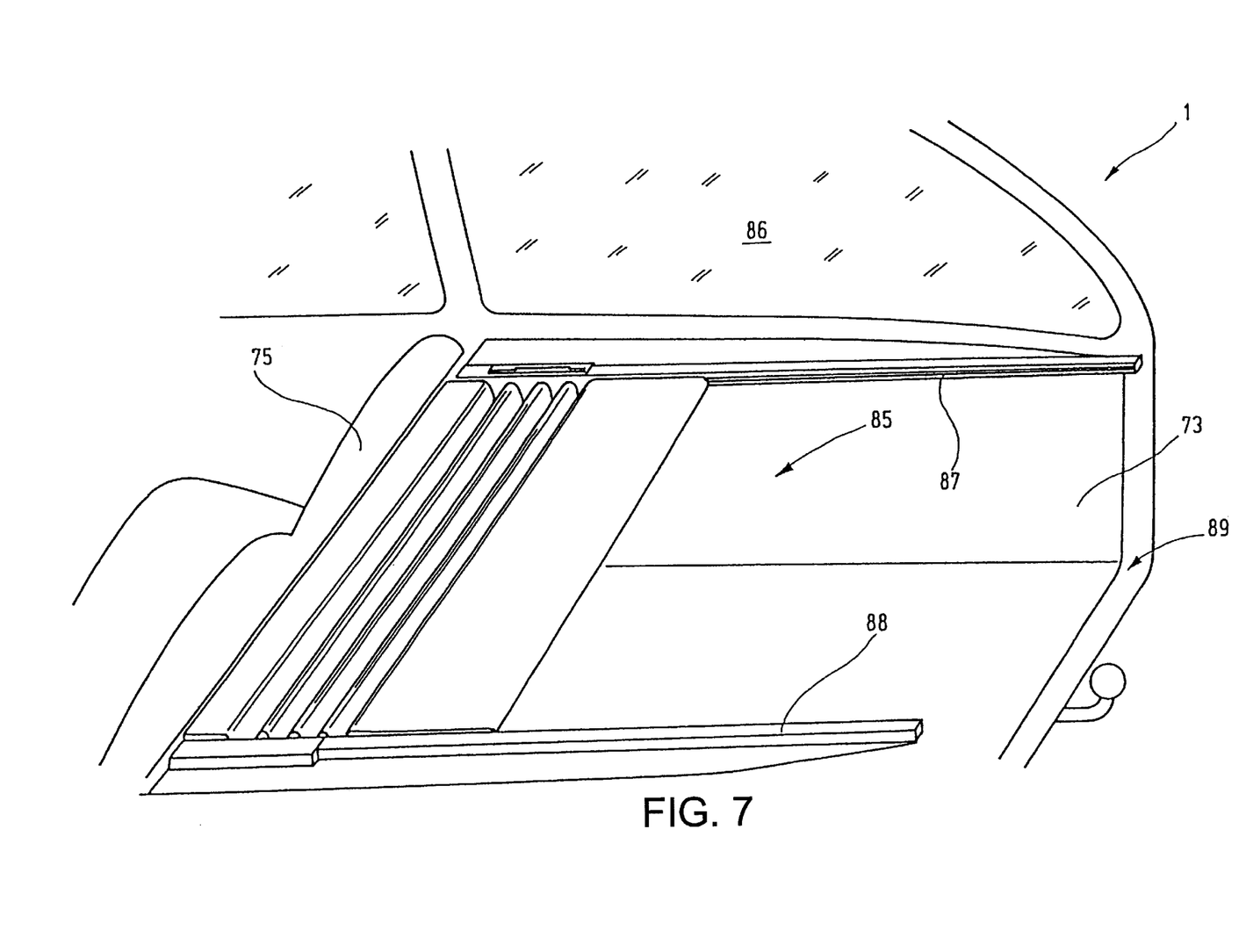
FIG. 7 is a perspective view of a foldable cargo area covering device as a further example of a covering system embodying the invention.
Figure 8:
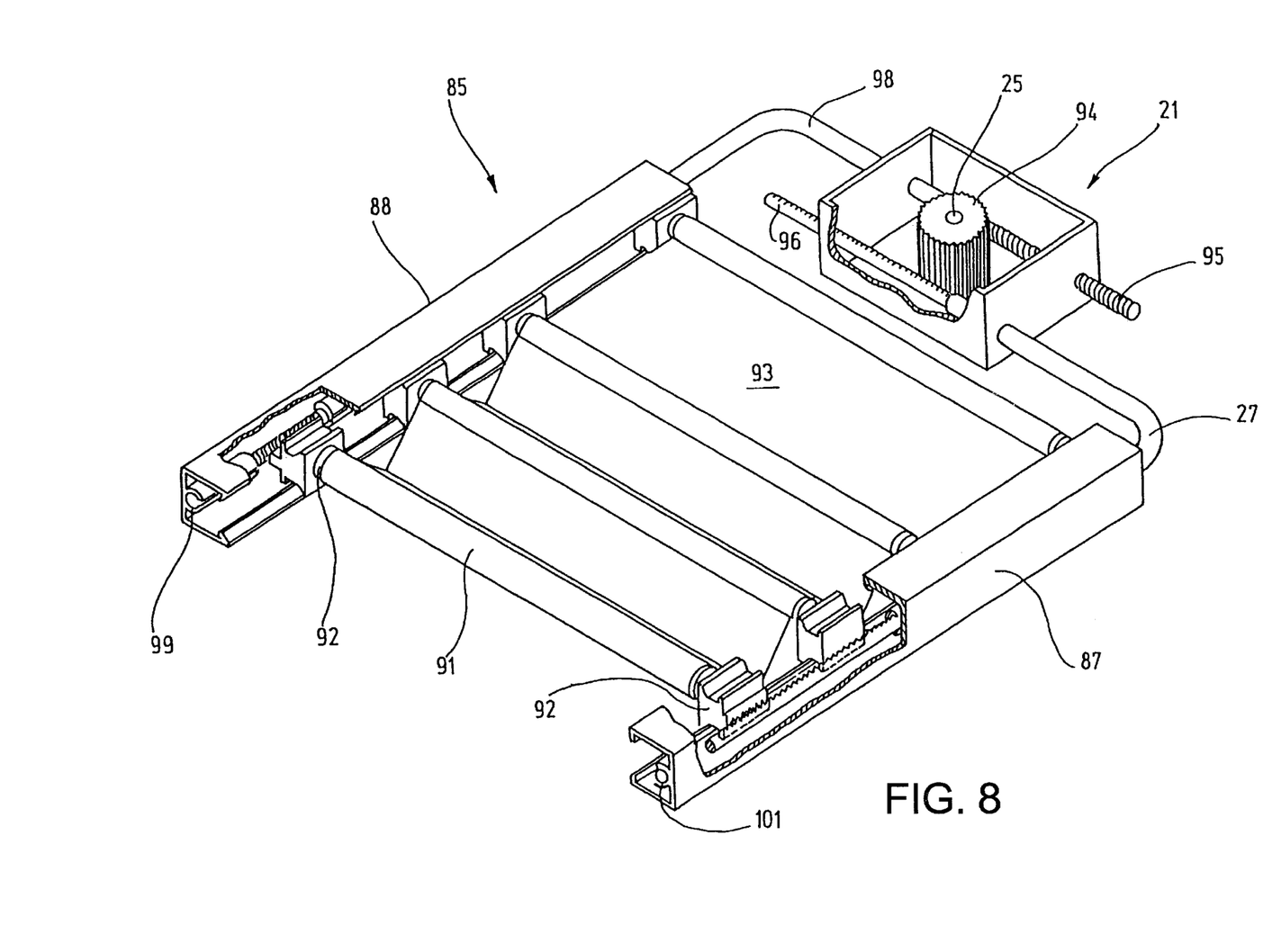
FIG. 8 is partially fragmented perspective view of a drive system of the cargo area covering device illustrated in FIG. 7.

The third example of use is represented in FIGS. 7 and 8. This is a cargo area covering 85 for the cargo area 73 of the passenger car 1. Two guide rails 87 and 88, which are attached underneath the side windows 86 and extend straight from the back of a rear seat back 75 up to a rear hatch opening 98, are part of the cargo area covering 85. Between the rails 87 and 88, which are C-shaped in cross section and are aligned parallel with each other, extend several hoops 91, which can be seen in FIG. 8 and are guided at their ends in the C-shaped rail 87, or 88, by means of guide elements 92.

A fabric covering 93 is supported and held by means of the hoops 91, or is spread open between the two guide rails 87 and 88. The hoop 92, which is connected with the front edge of the covering 93, is driven by means of the gear motor 21. On its output shaft the gear motor 21 has a front toothed wheel 94, which meshes with two flexible toothed racks 95 and 96 tangentially passing by the toothed wheel 94.

Starting at the housing of the gear motor 21, the toothed racks 95 and 96 run through guide tubes 97 and 98 in guide grooves 99 and 101 arranged, as represented, in the interior of the C-shaped guide rails 97 and 98. The guide blocks 92 mesh with the teeth of the flexible toothed racks 95 and 96 by means of a corresponding complementary tooth arrangement, which extends through the slot in the respective guide groove 99 and 101.

Control of the gear motor 21 takes place in the same way as has been extensively explained in connection with the rear window windup roller in accordance with FIG. 1. In the extended state, the flexible covering 93 essentially extends in a plane, stretched between the two guide rails 87 and 88 and over their length. For retraction the gear motor 21 is started as described above and pulls the front hoop 91 which, in the extended state adjoins the rear opening 89, into a position in which it is as close as possible to the rear seat back 75. In this position the fabric covering 93 is folded, hanging down between the hoops 91, as can be partially seen in FIGS. 7 and 8.

What is claimed is:

1. A drive system for a covering device of a motor vehicle, the covering device being movable back and forth between a first end position and a second end position, the drive system comprising:

an electric motor for controlled movement of the covering device between the first and second end positions;

a current sensor for detecting current of the electric motor;

a control device for the electric motor, having a first input for receiving a control signal which causes the control device to put the electric motor into operation to move the covering device from the first end position to the second end position, a second input connected to the current sensor for receiving a current signal, and an output through which the electric motor controlled, the control device being programmed to measure a value of at least one current parameter when the electric motor moves the covering device to leave the first end position, store the measured value of the current parameter as a reference value, continuously compare the reference value with later detected values of the current parameter, and switch the current for the electric motor off when a predetermined relative relationship between a later detected value of the current parameter and the reference value is met.

2. The drive system in accordance with claim 1, wherein the covering device is a window windup roller.

3. The drive system in accordance with claim 1, wherein the covering device is a cargo area covering.

4. The drive system in accordance with claim 1, wherein the covering device is a separating screen for separating a cargo area from a passenger compartment of the motor vehicle.

5. The drive system in accordance with claim 1, wherein the electric motor is a permanently excited electric motor.

6. The drive system in accordance with claim 1, wherein the current sensor includes a resistor located in a power supply for the electric motor.

7. The drive system in accordance with claim 1, wherein an actuation switch is connected to the first input.

8. The drive system in accordance with claim 1, wherein a sensor is connected to the first input.

9. The drive system in accordance with claim 1, wherein the control device includes a low-pass filter for filtering the current signal.

10. The drive system in accordance with claim 1, wherein the current parameter is a speed of rise in the current during a predetermined time window.

11. The drive system in accordance with claim 10, wherein that the time window starts with a switch-on of the current for the electric motor.

12. The drive system in accordance with claim 10, wherein that the time window starts after a delay time following a switch-on of the current for the electric motor.

13. The drive system in accordance with claim 1, wherein that the current parameter is a magnitude of the current.

14. The drive system in accordance with claim 13, wherein the reference value is derived from a first peak value of the current.

15. The drive system in accordance with claim 14, wherein the reference value is derived from a maximum value of the current reached within a time window that starts with a switch-on of the current for electric motor.

16. The drive system in accordance with claim 1, wherein the reference value contains a correction value.

17. The drive system in accordance with claim 1, wherein the control device measures work performed by the electric motor within a time window for indicating mechanical stiffness of the drive system and for creating a correction value for the reference value.

18. The drive system in accordance with claim 17, wherein the time window starts at a switch-on of the current for the electric motor.

19. The drive system in accordance with claim 1, wherein the control device determines a correction value for the reference value based on a relationship between a first peak value of the current and an averaged or minimal current.

20. The drive system in accordance with claim 1, wherein the control device sets a fixed time slot having a first edge defining an earliest time for stopping the electric motor and a second edge defining a latest time for stopping the electric motor.

21. The drive system in accordance with claim 1, wherein in case of interruptions of the current the control device accumulates time periods during which the electric motor had been provided with current for comparison with the time slot.

22. The drive system in accordance with claim 1, wherein that the reference value is updated during each run of the drive system.

23. The drive system in accordance with claim 1, wherein the reference value is determined based on an updated averaged reference value.

24. The drive system in accordance with claim 1, wherein the control device is arranged in a spatial vicinity of the drive system.

25. The drive system in accordance with claim 1, wherein the control device sets the reference value within preselected limits.

26. The drive system in accordance with claim 1, wherein the control device stores a history of the current in a memory, the history including information regarding a number of runs of the drive system, and maximum values of the current parameter reached in the runs.

* * * * *